United States Patent [19]
Tomcufcik

[11] 3,878,201
[45] Apr. 15, 1975

[54] 1,5-BIS SUBSTITUTED-1,4-PENTADIEN-3-ONE SUBSTITUTED AMIDINO HYDRAZONE SALTS AND METHOD OF PREPARING THE SAME

[75] Inventor: Andrew Stephen Tomcufcik, Old Tappan, N.J.

[73] Assignee: American Cyanamid Company, Stamford, Conn.

[22] Filed: Mar. 1, 1973

[21] Appl. No.: 337,033

Related U.S. Application Data

[63] Continuation-in-part of Ser. No. 131,412, April 5, 1971, abandoned.

[52] U.S. Cl. ............ 260/240 G; 424/244; 424/251; 424/273; 260/239 BC; 260/256.4 N; 260/309; 260/309.2; 260/309.6; 260/564 F
[51] Int. Cl. .................... C07c 133/10; C09b 23/00
[58] Field of Search ......... 260/240 G, 240 A, 564 F

[56] References Cited
FOREIGN PATENTS OR APPLICATIONS
40-4634  12/1965  Japan.............................. 260/240 G
40-4635  12/1965  Japan.............................. 260/240 G
40-4636  12/1965  Japan.............................. 260/240 G

OTHER PUBLICATIONS

Takai, et al., J. Pharm. Soc. Japan, Vol. 84, pp. 1 to 9, (1964).

Takai, et al., J. Pharm. Soc. Japan, Vol. 84, pp. 16 to 23, (1964).

*Primary Examiner*—John D. Randolph
*Attorney, Agent, or Firm*—Ernest Y. Miller

[57] ABSTRACT

The preparation of 1,5-bis-substituted-1,4-pentadien-3-one, substituted amidinohydrazone salts are described. They are prepared by the reaction of a 1,5-bis(substituted)-1,4-pentadiene-3-one with a substituted aminoguanidine salt. These compounds are useful as anti-malarial and anti-tubercular agents in warm-blooded animals.

12 Claims, No Drawings

1,5-BIS SUBSTITUTED-1,4-PENTADIEN-3-ONE SUBSTITUTED AMIDINOHYDRAZONE SALTS AND METHOD OF PREPARING THE SAME

This application is a continuation-in-part of my application Ser. No. 131,412, filed Apr. 5, 1971, now abandoned.

This invention relates to 1,5-bis substituted-1,4-pentadien-3-one substituted amidinohydrazone salts and method of preparing the same.

In my original application there is described compounds which may be illustrated by the following formula:

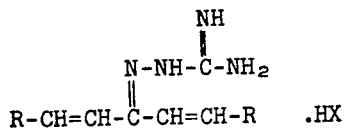

wherein R is phenyl, halophenyl or naphthyl and HX is a pharmaceutically acceptable acid for use as antimalarial agents. The preferred acid salt is the hydrochloride although other salts such as sulfate, nitrate, maleate, fumarate, bromide, iodide, etc., can be used. The term halo is intended to include chloro, bromo, fluoro and iodo within the scope of the present invention.

The compounds of the original application are usually crystalline solids and in general, have melting points in excess of two hundered degrees centigrade.

Among the compounds of the original application are, for example, 1,5-bis(4-chlorophenyl)-1,4-pentadien-3-one amidinohydrazone hydrochloride; 1,5-bis(4-iodophenyl)-1,4-pentadien-3-one amidinohydrazone hydroiodide; 1,5-bis(4-bromophenyl)-1,4-pentadien-3-one amidinohydrazone hydrobromide; 1,5-bis(2-chlorophenyl)-1,4-pentadien-3-one amidinohydrazone hydrochloride; 1,5-bis(2-chlorophenyl)-1,4-pentadien-3-one amidinohydrazone hydrobromide; 1,5-bis(2-bromophenyl)-1,4-pentadien-3-one amidinohydrazone hydrobromide; 1,5-diphenyl-1,4-pentadien-3-one amidinohydrazone hydrochloride; 1,5-diphenyl-1,4-pentadien-3-one amidinohydrazone hydrobromide; 1,5-bis-4-fluorophenyl)-1,4-pentadien-3-one amidinohydrazone hydrochloride; 1,5-bis(4-fluorophenyl)-1,4-pentadiene-3-one amidinohydrazone hydrochloride; 1,5-bis(3-chlorophenyl)-1,4-pentadien-3-one amidinohydrazone hydrochloride; 1,5-bis-(3-bromophenyl)-1,4-pentadien-3-one amidinohydrazone hydrochloride; 1,5-bis(3-fluorophenyl)-1,4-pentadien-3-one amidinohydrazone hydrochloride, 1,5-bis(2-naphthyl)-1,4-pentadien-3-one amidinohydrazone hydrochloride and the like.

It has now been found that compounds of the following formula are highly active as anti-tubercular compounds:

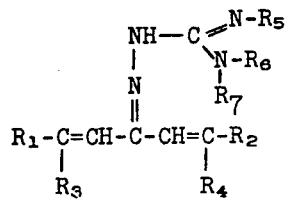

wherein $R_1$ and $R_2$ may be the same or different and are selected from the group consisting of phenyl, halophenyl, carboxyphenyl lower alkoxy($C_1$-$C_4$)phenyl, diloweralkoxy($C_1$-$C_4$)phenyl, biphenyl, alkyl($C_1$-$C_4$)phenyl, dialkyl($C_2$-$C_8$)phenyl, nitrophenyl, trifluoromethylphenyl, lower alkyl($C_1$-$C_4$)sulfonylphenyl, lower alkyl($C_1$-$C_4$)thiophenyl, methylenedioxyphenyl, cyanophenyl, sulfamylphenyl, carboloweralkoxy($C_1$-$C_4$)phenyl, naphthyl, lower alkoxy($C_1$-$C_4$)naphthyl and halonaphthyl; $R_3$ and $R_4$ may be the same or different and are selected from the group consisting of hydrogen, lower alkyl $C_1$-$C_4$, phenyl and halophenyl; $R_5$ and $R_6$ are lower alkyl $C_1$-$C_4$ and when taken together an alkylene group of 2 to 9 carbon atoms, methyl or a phenyl alkylene group of 2 to 4 carbon atoms, a dimethyl or diphenyl alkylene group of 2 to 4 carbon atoms and $R_7$ is hydrogen or lower alkyl $C_1$-$C_4$ and non-toxic acid salts thereof.

Among the compounds of this application may be, for example, 1,5-bis(p-tolyl)-1,4-pentadien-3-one amidinohydrazone hydrochloride; 1,5-bis-(p-chlorophenyl)-1,4-pentadien-3-one N-methylamidinohydrazone hydroiodide, 1,5-bis(p-chlorophenyl)-1,4-pentadien-3-one N,N-dimethylamidinohydrazone hydroiodide, 1,5-bis(p-isopropylphenyl)-1,4-pentadien-3-one N,N-dimethylamidinohydrazone hydroiodide; 1,5-bis(p-chlorophenyl)-1,4-pentadien-3-one N,N'-diethylamidinohydrazone hydroiodide; 1,5-bis(p-chlorophenyl)-1,4-pentadien-3-one N,N'-diisopropylamidinohydrazone hydroiodide; 1,5-bis(p-chlorophenyl)-1,4-pentadien-3-one 2-imidazolin-2-ylhydrazone hydrochloride; 1,5-bis(p-ethylphenyl)-1,4-pentadien-3-one 2-imidazolin-2-ylhydrazone hydrobromide; 1,5-bis(p-methoxyphenyl)-1,4-pentadien-3-one 2-imidazolin-2-ylhydrazone hydrobromide; 1,5-bis-(p-tolyl)-1,4-pentadien-3-one 2-imidazolin-2-ylhydrazone hydrobromide; 1,5-bis(p-bromophenyl)-1,4-pentadien-3-one 2-imidazolin-2-ylhydrazone hydrobromide; 1,5-bis(4-biphenylyl)-1,4-pentadien-3-one 2-imidazolin-2-ylhydrazone hydrobromide; 1,5-bis($\alpha,\alpha,\alpha$-trifluoro-p-tolyl)-1,4-pentadien-3-one 2-imidazolin-2-ylhydrazone hydrobromide; 1,5-bis(p-methylthiophenyl)-1,4-pentadien-3-one 2-imidazolin-2-ylhydrazone hydrobromide; 1,5-bis(2-naphthyl)-1,4-pentadien-3-one 2-imidazolin-2-ylhydrazone hydrobromide; 1,5-bis(1-naphthyl)-1,4-pentadien-3-one 2-imidazolin-2-ylhydrazone hydrobromide; 1,5-bis(p-nitrophenyl)-1,4-pentadien-3-one 2-imidazolin-2-ylhydrazone hydrobromide; 1,5-bis(3,4-methylenedioxyphenyl)-1,4-pentadien-3-one 2-imidazolin-2-ylhydrazone hydrobromide; 1,5-bis(m-nitrophenyl)-1,4-pentadien-3-one 2-imidazolin-2-ylhydrazone hydrobromide; 1,5-bis(3,4-dimethoxyphenyl)-1,4-pentadien-3-one 2-imidazolin-2-ylhydrazone hydrobromide; 1,5-bis(o-tolyl)-1,4-pentadien-3-one 2-imidazolin-2-ylhydrazone hydrobromide; 1,5-bis(m-tolyl)-1,4-pentadien-3-one 2-imidazolin-2-yl hydrazone hydrobromide; 1,5-bis-(o-chlorophenyl)-1,4-pentadien-3-one 2-imidazolin-2-ylhydrazone hydrobromide; 1,5-bis(m-chlorophenyl)-1,4-pentadien-3-one 2-imidazolin-2-ylhydrazone hydrobromide; 1,5-bis(p-chlorophenyl)-1,4-pentadien-3-one 4-phenyl-2-imidazolin-2-ylhydrazone hydroiodide; 1,5-bis(p-chlorophenyl)-1,4-pentadien-3-one 5,5-diphenyl-2-imidazolin-2-ylhydrazone; 1,5-bis(p-chlorophenyl)-1,4-pentadien-3-one 3$\alpha$,4,5,6,7,7a- hexahydrobenzimidazol-2-ylhydrazone hydrobromide; 1,5-bis(p-chlorophenyl)-1,4-pentadien-3-one 4-methyl-2-imidazolin-2-ylhydrazone hydrochloride; 1,5-bis(p-chlorophenyl)-1,4-pentadien-3-one 5,5-dimethyl-2-imidazolin-2-ylhydrazone hydrochloride; 1-(p-chlorophenyl)-5-phenyl-1,4-pentadien-3-one 2-imidazolin-2-ylhydrazone hydrobromide; 1-(p-chlorophenyl)-5-(p-tolyl)-1,4-pentadien-3-one 2-imidazolin-2-ylhydrazone hydrobromide; 1,5-bis(p-chlorophenyl)-1,4-pentadien-3-one 1,4,5,6-tetrahydropyrimidin-2-ylhydrazone hydrochloride; 1,5-bis(m-tolyl)-1,4-pentadien-3-one 1,4,5,6-tetrahydropyrimidin-2-ylhydrazone hydrochloride; 1,5-bis-(p-chlorophenyl)-1,4-pentadien-3-one 4,5,6,7-tetrahydro-1H-1,3-diazepin-2-ylhydrazone hydrochloride; 1,5-bis(p-cyanophenyl)-1,4-pentadien-3-one 4,5,6,7-tetrahydro-1H-1,3-diazepin-2-ylhydrazone hydrochloride; 1,5-bis(p-methylsulfonylphenyl)-1,4-pentadien-3-one-4,5,6,7-tetrahydro-1H-1,3-diazepin-2-yl hydrazone hydrochloride; 1,5-bis(p-sulfamoylphenyl)-1,4-pentadien-3-one 2-imidazolin-2-ylhydrazone hydrobromide; 1,5-bis(p-caroxyphenyl)-1,4-pentadien-3-one 2-imidazolin-2-ylhydrazone hydrobromide; 1,5-bis(4-methoxy-1-naphthyl)-1,4-pentadien-3-one-4,5,6,7-tetrahydro-1H-1,3-diazepin-2-ylhydrazone hydrochloride; 1,5-bis(p-chlorophenyl)-1,4-pentadien-3-one 5,5-dimethyl-1,4,5,6-tetrahydropyrimidin-2-ylhydrazone hydrobromide, and the like.

One method of preparing compounds of the present invention is illustrated by the following reaction:

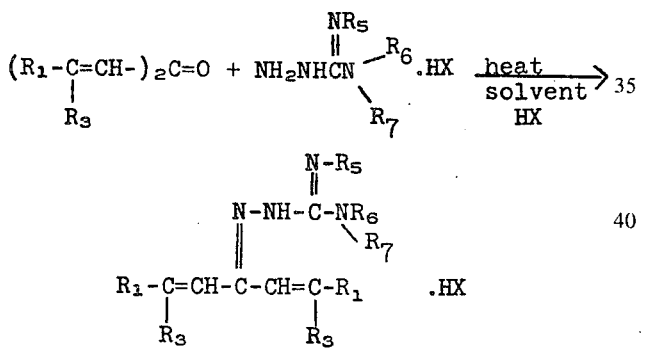

wherein $R$, $R_3$, $R_5$, $R_6$, $R_7$ and $X$ are as defined hereinbefore.

The reaction is carried out in a hydrophilic solvent such as ethanol, propanol, butanol, dioxane, etc., at a temperature which may vary from about 75° to 150°C. The time for completing the reaction may vary from about 1 to 24 hours. As catalyst a small portion of the acid HX may be added to the reaction mixture.

The compounds of the original application are useful for the treatment of malaria in warm-blooded animals. One procedure for determining the anti-malarial activity of the individual compounds against a blood-induced infection is with P. berghei in mice is as follows: Mice are inoculated (approximately 1–2 million parasitized red cells per mouse), randomized, and caged in groups of 5 or 10 mice. Drug-diet treatment is initiated within 1–3 hours postinoculation and is continued for 6 successive days (days 0–5 postinoculation). Appropriate groups of untreated controls (both infected and uninfected) are included, and, in most tests involving resistant strains, appropriate treated infected controls are included (i.e., treatment with chlorquine or pyrimethamine). Determinations of group (i.e., mean) mouse weights are made on the day of inoculation and on days 3 and 6 postinoculation. The food is weighed before and immediately after the treatment period, and mean daily intakes of the compounds are determined. Giemsa-strained thin blood films are prepared once from 3–10 mice in each treated group on days 7-12-postinoculation, and the mean parasitemia is compared with that of appropriate untreated controls. Mortality is recorded daily, with an observation period of at least 30 days postinoculation. The survival of treated animals for 30 days is considered indicative of a "curative" effect, although no measures are taken to determine conclusively the presence or absence of parasites at the end of the 30-day period. Median survival times are determined by inspection or through the application of Litchfield's rapid graphic method. The following results were obtained with representative compounds of this invention.

The compounds of this invention are active against Mycobacterium tuberculosis H37Rv infections in mice when tested in accordance with the following proce- TABLE I
Effects of 1,5-Bis Substituted-1,4-pentadien-3-ones in blood induced P. berghei infections in mice

| NH<br>‖<br>N-NH-C-NH$_2$<br>‖<br>R-CH=CH-C-CH=CH-R<br>.HCl | Drug Diet Approx. mg./kg. per day x 5 day | % Parasite Suppression day 8 | Median Survival Time, days Post-inoculation treated/untreated | % Survival of 5 mice 30 days |
|---|---|---|---|---|
| R = 4-chlorophenyl | 194 | >99 | >30/7 | 100 |
|  | 101 | >99 | >30/11 | 100 |
| R = phenyl | 165 | >99 | >30/11 | 80 |
| R = naphthyl | 191 | 50 | 14/11 | 0 | dure. Carworth Farms CF1 white mice, females, 4 to 6 weeks old, weighing 17 to 22 grams, are infected with Mycobacterium tuberculosis H37Rv by administration intraveneously of 0.2 ml. of a buffered saline suspension containing approximately 1.5 mg. per ml. wet weight of a 12 to 14 day culture of the test organism grown on Sauton's agar medium. Routinely, 200–300 mice are given this standard infection and then segregated in a random manner into cages each of which holds five or 10 mice. Four groups of five mice each are retained as untreated controls and the remaining mice are used to ascertain activity of compounds under test. During a one year experience with this test, the standard infection defined above caused a 99.5 percent mortality, in that 756 of the 760 infected untreated control mice died within 28 days, the normal period of the test.

A measured amount of each compound to be tested is administered orally incorporated in a Standard Diet to groups of infected mice for 14 days, after which the mice are fed untreated Standarad Diet. Control animals receive untreated Standard Diet for the entire test period and all animals are allowed to feed at will. Tests are terminated 28 days after the day of infection. A compound is judged active if it either saves one or two of two mice in a test group, or two or more of five mice in a test group in two tests, or prolongs average survival time by 4 or more days compared to untreated controls.

The Standard Diet used in this test procedure is a commercial feed designated for laboratory mice and rats composed of the following ingredients: Animal liver meal, fish meal, dried whey, corn and wheat flakes, ground yellow corn, ground oat groats, dehulled soybean meal, wheat germ meal, wheat middlings, cane molasses, dehydrated alfalfa meal, soybean oil, brewers' dried yeast, irradiated dried yeast (source of Vitamin $D_2$), riboflavin, niacin, calcium pantothenate, choline chloride, Vitamin A palmitate, D-activated animal sterol, $\alpha$-tocopherol, dicalcium phosphate, thiamine hydrochloride, medadione sodium bisulfite (source of Vitamin K activity), salt and traces of manganous oxide, copper sulfate, iron carbonate, potassium iodate, cobalt sulfate, and zinc oxide. The said commercial feed has the guaranteed analysis as containing a minimum of 24.0 percent crude protein, a minimum of 4.0 percent crude fat and a maximum of 4.5 percent crude fiber and is sold under the trademark Wayne Lab-Blox by Allied Mills, Inc., Chicago, Ill. In the test procedure described hereinabove, the Standard Diet into which measured amounts of the test compounds had been homogeneously incorporated was administered to infected test animals, whereas untreated Standard Diet was given to infected control animals.

The following Table II shows the activity against Mycobacterium tuberculosis infections in mice.

TABLE II

| Compound of Example | | Percent of Compound in Diet | Alive/Total Mice Tested 28 Days after Infections |
|---|---|---|---|
| 2 | | 0.05 | 4/5 |
|  | | 0.025 | 3/5 |
| 10 | | 0.05 | 2/2 |

TABLE II – Continued

| Compound of Example | | Percent of Compound in Diet | Alive/Total Mice Tested 28 Days after Infections |
|---|---|---|---|
| 11 | | 0.025 | 4/5 |
| 12 | | 0.1 | 2/2 |
|  | | 0.025 | 1/2 |
| 13 | | 0.05 | 3/5 |
| 14 | | 0.05 | 2/2 |
| 15 | | 0.05 | 2/2 |
| 16 | .HCl salt | 0.05 | 2/2 |
|  | .HBr salt | 0.05 | 2/2 |
| 17 | | 0.1 | 3/5 |
| 18 | | 0.05 | 5/5 |
|  | | 0.0125 | 2/5 |
| 19 | | 0.05 | 5/5 |
|  | | 0.0125 | 2/5 |
| 20 | | 0.05 | 3/5 |
|  | | 0.0125 | 2/5 |
| 21 | | 0.05 | 2/5 |
| 22 | | 0.05 | 2/5 |
|  | | 0.0125 | 3/5 |
| 23 | | 0.05 | 3/5 |
| 24 | | 0.05 | 2/5 |
| 34 | | 0.05 | 2/2 |
| 35 | | 0.05 | 2/2 |
| 36 | | 0.05 | 2/2 |
| 39 | | 0.05 | 2/2 |
| 40 | | 0.05 | 2/2 |
| 41 | .HCl salt | 0.05 | 4/5 |
|  |  | 0.025 | 3/5 |
|  | .HI salt | 0.05 | 5/5 |
| 43 | .HCl salt | 0.05 | 5/5 |
|  |  | 0.0125 | 4/5 |
|  | .HI salt | 0.05 | 2/2 |

Compositions containing as the active component a 1,5-bis substituted-1,4-pentadien-3-one substituted amidinohydrazones of this invention may be administered to warmblooded animals orally, or parenterally if desired, and when so administered, may be considered as an agent for the therapeutically desirable treatment of tuberculosis infections in daily doses ranging from about 5 mg. to about 100 mg. per kilogram. The dose regimen can be adjusted to provide optimum therapeutic response. Thus, for example, several smaller doses may be administered daily, or the dose may be reduced or increased proportionately as indicated by the requirements or the particular therapeutic situation.

The therapeutic administration the active compounds of this invention may be incorporated with pharmaceutically acceptable carriers such as excipients and used, for example, in the form of tablets, dragees, capsules, suppositories, liquids, elixirs, emulsions, suspensions or the like. Such compositions and preparations should contain at least 5 percent active component. The percentage in the compositions and preparations, may of course, be varied, and may conveniently be between 10 and 60 percent or more of the weight of the unit. The amount of compound in such therapeutically useful compositions or preparations is such that a suitable dosage will be obtained. Preferred compositions or preparations according to the present invention are prepared so that a dosage unit form contains between about 10 and about 500 milligrams of the active compound. Obviously, in addition to the therapeutic compound, there may be present excipients, binders, fillers and other therapeutically inert ingredients necessary in the formulation of the desired pharmaceutical preparation.

SPECIFIC DISCLOSURE

The following examples describe in detail the preparation of representative compounds of this invention and formulations containing these compounds.

EXAMPLE 1

Preparation of the Amidinohydrazone Hydrochlorides of 1,5-bis-(phenyl, halophenyl, alkylphenyl, or naphthyl)-1,4-pentadien-3-one A suspension of the 1,5-bis(phenyl, halophenyl, alkylphenyl, or naphthyl)-1,4-pentadien-3-one and an aminoguanidine acid salt at (10 percent molar excess) in a hydrophilic solvent containing a catalytic amount of concentrated mineral acid is stirred at refluxing temperatures for a period of hours. In most cases, solution occurs, followed by precipi ation of the desired amidinohydrazone acid salt derivative. The precipitate is collected from the reaction mixture, washed with, for example, ethanol and ether, and then dried. In some instances, cooling to $-10°C$. is necessary to effect formation of a precipitate.

EXAMPLE 2

Preparation of 1,5-Bis(4-chlorophenyl)-1,4-pentadien-3-one Amidinohydrazone Hydrochloride Utilizing the general procedure of Example 1, 4.5 grams of 1,5-bis(4-chlorophenyl)-1,4-pentadien-3-one, 1.9 grams of aminoguanidine hydrochloride, 5 drops of concentrated hydrochloric acid, and 150 ml. of ethanol, and employing a 4 hour reflux period, 3.1 grams of the above compound is obtained, melting at 233°–234°C.

The starting material, 1,5-bis(4-chlorophenyl)-1,4-pentadien-3-one, is prepared by the method of Neunhoeffer et al., Chem. Ber. 86 229 (1953). It melts at 195°–197°C. after recrystallization from benzene.

EXAMPLE 3

Preparation of 1,5-Bis(2-chlorophenyl)-1,4-pentadien-3-one Amidinohydrazone Hydrochloride Following the general procedure of Example 1, 9.1 grams of 1,5-bis(2-chlorophenyl)-1,4-pentadien-3-one, 4 grams of amino-guanidine hydrochloride, 10 drops of concentrated hydrochloric acid and 250 ml. of ethanol, and employing a 6.5 hour reflux period, 7.4 grams of the title compound is obtained, melting at 243°–244°C.

The starting material, 1,5-bis(2-chlorophenyl)-1,4-pentadien-3-one, is prepared by the method of Straus, et al., Ber. 51 1457 (1918).

EXAMPLE 4

Preparation of 1,5-Diphenyl-1,4-pentadien-3-one Amidinohydrazone Hydrochloride

Using the general procedure of Example 1, 11.7 grams of 1,5-diphenyl-1,4-pentadien-3-one, 6.0 grams of aminoguanidine hydrochloride, 10 drops of concentrated hydrochloric acid and 250 ml. of ethanol, and employing a 16 hour reflux period, followed by cooling at $-10°C$., there is obtained 9.9 grams of the subject compound, melting at 223°–225°C. with decomposition.

The starting material, 1,5-diphenyl-1,4-pentadien-3-one, is commercially available.

EXAMPLE 5

Preparation of 1,5-Bis(4-fluorophenyl)-1,4-pentadien-3-one Amidinohydrazone Hydrochloride Utilizing the procedure of Example 1, 13.5 grams of 1,5-bis(4-fluorophenyl)-1,4-pentadien-3-one, 6 grams of aminoguanidine hydrochloride, 15 drops of concentrated hydrochloric acid and 400 ml. of ethanol, and employing a 6.5 hour reflux period, 10.6 grams of the above compound is obtained, melting at 246°–247°C.

The starting material, 1,5-bis(4-fluorophenyl)-1,4-pentadien-3-one, is prepared by the method of Neunhoeffer et al., Chem. Ber. 86 229 (1953). It melts at 153°–154°C.

EXAMPLE 6

Preparation of 1,5-Bis(4-Bromophenyl)-1,4-pentadien-3-one Amidinohydrazone Hydrochloride Following the general procedure of Example 1, 11.7 g. of 1,5-bis(4-bromophenyl)-1,4-pentadien-3-one, 4 grams of aminoguanidine hydrochloride, 10 drops of concentrated hydrochloride acid and 400 ml. of ethanol, and employing an 8.5 hour reflux period, there is obtained 1.2 grams of the above compound, melting at 238°–240°C.

The starting material, 1,5-bis(4-bromophenyl)-1,4-pentadien-3-one, is prepared by the procedure of Neunhoeffer et al., Chem. Ber. 86 229 (1953).

EXAMPLE 7

Preparation of 1,5-Bis(3-Chlorophenyl)-1,4-pentadien-3-one Amidinohydrazone Hydrochloride Utilizing the general procedure of Example 1, 9.1 grams of 1,5-bis(3-chlorophenyl)-1,4-pentadienon-3-one, 4 grams of aminoguanidine hydrochloride, 10 drops of concentrated hydrochloric acid, and 250 ml. of ethanol, and employing a 7 hour reflux period, 4.3 grams of the above compound is obtained, melting at 217°–220°C.

The starting material, 1,5-bis(3-chlorophenyl)-1,4-pentadien-3-one, is prepared by the method of Neunhoeffer at al., Chem. Ber. 86 (1953), and melts at 127°–128°C.

EXAMPLE 8

Preparation of 1,5-Bis(2-Naphthyl)-1,4-pentadien-3-one Amidinohydrazone Hydrochloride Utilizing the general procedure of Example 1, 6.9 grams of 1,5-bis(2-naphthyl)-1,4-pentadien-3-one, 2.5 grams of aminoguanidine hydrochloride, 5 drops of concentrated hydrochloric acid, and 250 ml. of ethanol, and employing a 16 hour reflux period, 6.4 g. of the above compound is obtained, melting at 232°–234°C.

The starting material, 1,5-bis(2-naphthyl)-1,4-pentadien-3-one is prepared by the procedure of Gibson, et al., J. Chem. Soc. 1926 2247.

EXAMPLE 9

Preparation of Tablet Compositions Containing 1,5-Bis(4-chlorophenyl)-1,4-Pentadien-3-one Amidinohydrazone Hydrochloride

| | 500 Tablets |
|---|---|
| 1,5-bis-(4-chlorophenyl)-1,4-pentadien-3-one amidinohydrazone hydrochloride | 50.0 g. |
| Corn starch USP | 150.0 g. |

| | |
|---|---|
| -Continued | |
| Dibasic Calcium phosphate | 1075.0 g. |
| Magnesium stearate | 300.0 g. |

The above ingredients are thoroughly mixed and incorporated into a standard pharmaceutical tablet. Each tablet contains 100 mg. of therapeutic component.

EXAMPLE 10

Preparation of 1,5-Bis-(p-tolyl)-1,4-pentadien-3-one Amidinohydrazone Hydrochloride The preparation of the subject compound is carried out essentially by the procedure of Example 1, 1,5-bis(p-tolyl)-1,4-pentadien-3-one replacing the 1,5-bis(p-chlorophenyl)-1,4-pentadien-3-one. The compound melts at 170°–174°C. with decomposition. Microanalytical data are in agreement with the assined structure.

The starting 1,5-bis(p-tolyl)-1,4-pentadien-3-one is prepared by the procedure of Gatterman, Ann. 347 363, and melts at 179.5°–180.5°.

EXAMPLE 11

Preparation of 1,5-Bis(p-chlorophenyl)-1,4-pentadien-3-one N-methylamidinohydrazone hydroiodide A mixture consisting of 3.03 grams of 1,5-bis(p-chlorophenyl)-1,4-pentadien-3-one, 2.16 grams of 1-amino-3-methylguanidine hydroiodide, 3 drops of 57 percent hydroiodic acid, and 50 ml. of n-propanol is stirred and heated under refluxing conditions for two hours. Cooling failed to yield a product. After concentration to about 15 ml. of volume, and addition of 60 ml. of ether, a yellow product is obtained. Recrystallization from ethanol gives 2.67 grams of the subject compound, melting 213°–214.5°C.

1-Amino-3-methylguanidine hydroiodide is prepared by the method of Kirsten and Smith, J. Am. Chem. Soc. 58 800 (1936).

EXAMPLE 12

Preparation of 1,5-Bis(p-chlorophenyl)-1,4-pentadien-3-one N,N-dimethylamidinohydrazone hydroiodide The preparation of the subject compound is carried out essentially by the procedure of Example 11, 1-amino-3,3-dimethylguanidine hydroiodide replacing the 1-amino-3-methylguanidine hydroiodide. The product melts at 233°–235°C.

The 1-amino-3,3-dimethylguanidine hydroiodide is prepared by the method of Finnegan, Henry and Lieber, J. Org. Chem. 18 779 (1953).

EXAMPLE 13

Preparation of 1,5-Bis(p-isopropylphenyl)-1,4-pentadien-3-one N,N-dimethylamidinohydrazone hydroiodide The preparation of the subject compound is carried out essentially by the procedure of Example 12, 1,5-bis(p-isopropylphenyl)-1,4-pentadien-3-one replacing the 1,5-bis(p-chlorophenyl)-1,4-pentadien-3-one. It melts at 183°–187°C.

The starting material, 1,5-bis(p-isopropylphenyl)-1,4-pentadien-3-one, is prepared by the reaction of two moles of p-isopropylbenzaldehyde and one mole of acetone in ethanol in the presence of concentrated sodium hydroxide. It melts at 101°–103°C. after recrystallization from benzene-hexane.

EXAMPLE 14

Preparation of 1,5-Bis(p-Chlorophenyl)-1,4-pentadien-3-one N,N'-diethylamidinohydrazone hydroiodide The preparation of the title compound is effected by the procedure of Example 11, 1-amino-2,3-diethylguanidine hydroiodide replacing the 1-amino-3-methylguanidine hydroiodide. The compound melts at 208°–211°C.

1-Amino-2,3-diethylguanidine hydroiodide is prepared as follows: N,N'-diethylthiourea and methyl iodide are heated to yield N,N'-diethyl-S-methylisothiourea hydroiodide, which upon treatment with hydrazine in boiling isopropanol yields a solution of the desired intermediate.

EXAMPLE 15

Preparation of 1,5-Bis(p-chlorophenyl)-1,4-pentadien-3-one N,N'-diisopropylamidinohydrazone hydroiodide The subject compound is prepared essentially by the procedure of Example 11, 1-amino-2,3-diisopropylguanidine hydroiodide replacing the 1-amino-3-methylguanidine hydroiodide. The compound melts at 204°–205°C.

The 1-amino-2,3-diisopropylguanidine hydroiodide is prepared as follows: N,N'-diisopropylthiourea and methyl iodide are heated to yield N,N'-diisopropyl-S-methylisothiourea hydroiodide, which upon treatment with hydrazine in boiling isopropanol, yields a solution of the desired intermediate.

EXAMPLE 16

Preparation of 1,5-Bis(p-chlorophenyl)-1,4-pentadien-3-one 2-imidazolin-2-ylhydrazone hydrochloride A mixture consisting of 6 grams of 1,5-bis(p-chlorophenyl)-1,4-pentadien-3-one, 3.6 grams of 2-imidazolin-2-ylhydrazine hydrobromide, 10 drops of 48 percent aqueous hydrobromic acid and 80 ml. of n-propanol is stirred and heated at reflux for two hours. The reaction mixture is then concentrated to about one-half its volume and cooled at −10°C. The yellow crystalline precipitate is collected, washed with ether, and then added to a slight excess of aqueous 2N sodium hydroxide. The resultant free base is collected, dried, dissolved in ether and treated with a slight excess of 7.2 N n-propanolic hydrogen, chloride, yielding the title compound melting at 239°–240°C. If the original hydrobromide salt is recrystallized from methanol, a product containing one mole of methanol of crystallization is obtained, melting at 206.5°–208.5°C.

2-Imidazolin-2-ylhydrazine hydroiodide is prepared by the method of Finnegan, Henry, and Lieber, J. Org. Chem. 18 799 (1953). Treatment with silver chloride in aqueous or ethanol solution yields the hydrochloride, melting at 177°–180°C. The hydrobromide salt is prepared by the reaction of hydrazine upon 2-ethylthio-2-imidazoline hydrobromide in aqueous or ethanol solution. It melts at 184°–185°C. 2-Ethylthio-2-imidazoline hydrobromide is prepared by the method of Bova and Meadow, Anal. Chem. 32 551 (1960).

EXAMPLE 17

Preparation of 1,5-Bis(p-Ethylphenyl)-1,4-pentadien-3-one 2-imidazolin-2-ylhydrazine hydrobromide The subject compound is prepared essentially by the procedure of Example 16, 1,5-bis(p-ethylphenyl)-1,4- pentadien-3-one replacing the 1,5-bis(p-chlorophenyl)-1,4-pentadien-3-one. The compound melts at 140°–144°C.

The starting material, 1,5-bis(p-ethylphenyl)-1,4-pentadien-3-one, is prepared by the reaction of two moles of p-ethylbenzaldehyde and one mole of acetone in ethanol in the presence of concentrated sodium hydroxide solution. It is recrystallized from benzene-hexane and melts at 123.5°–125°C.

EXAMPLE 18

Preparation of 1,5-Bis(p-Methoxyphenyl)-1,4-pentadien-3-one 2-imidazolin-2-ylhydrazone hydrobromide The title compound is prepared essentially by the procedure of Example 16, 1,5-bis(p-methoxyphenyl)-1,4-pentadien-3-one replacing the 1,5-bis(p-chlorophenyl)-1,4-pentadien-3-one. It precipitates with one mole of n-propanol of crystallization and melts at 125°–135°C. with decomposition.

The starting material, 1,5-bis(p-methoxyphenyl)-1,4-pentadien-3-one, is prepared by the procedure of Baeyer and Villeger, Ber. 35 1192 (1902).

EXAMPLE 19

Preparation of 1,5-Bis(p-Tolyl)-1,4-pentadien-3-one 2-imidazolin-2-ylhydrazone hydrobromide The title compound is prepared essentially by the procedure of Example 16, 1,5-bis(p-tolyl)-1,4-pentadien-3-one replacing the 1,5-bis(p-chlorophenyl)-1,4-pentadien-3-one. It precipitates with one mole of n-propanol of crystallization and melts at 173°–177°C.

EXAMPLE 20

Preparation of 1,5-Bis(p-Bromophenyl)-1,4-pentadien-3-one 2-imidazolin-2-ylhydrazone hydrobromide The above compound is prepared essentially by the procedure of Example 16, 1,5-bis(p-bromophenyl)-1,4-pentadien-3-one replacing the 1,5-bis(p-chlorophenyl)-1,4-pentadien-3-one. It precipitates with one mole of n-propanol of crystallization and melts at 228°–232°C., after previous softening.

The starting material, 1,5-bis(p-bromophenyl)-1,4-pentadien-3-one, is prepared by the procedure of Neunhoeffer and Rosache, Chem. Ber. 86 229 (1953).

EXAMPLE 21

Preparation of 1,5-Bis(4-Biphenylyl)-1,4-pentadien-3-one 2-imidazolin-2-ylhydrazone hydrobromide The preparation of the title compound is carried out essentially by the procedure of Example 16, 1,5-bis(4-biphenylyl)-1,4-pentadien-3-one replacing the 1,5-bis(p-chlorophenyl)-1,4-pentadien-3-one. The compound precipitates with one mole of n-propanol of crystallization and melts at 221°–225°C.

The starting material, 1,5-bis(4-biphenylyl)-1,4-pentadien-3-one, is prepared by the procedure of Cromwell and Cahay, J. Am. Chem. Soc. 80 5524 (1958).

EXAMPLE 22

Preparation of 1,5-Bis($\alpha,\alpha,\alpha$-Trifluoro-p-tolyl)-1,4-pentadien-3-one-2-imidazolin-2-ylhydrazone hydrobromide The title compound is prepared essentially by the procedure of Example 16. It precipitates with one mole of n-propanol of crystallization and melts at 220°C. with decomposition.

The starting material, 1,5-bis($\alpha,\alpha,\alpha$-trifluoro-p-tolyl)-1,4-pentadien-3-one, is prepared by the reaction of two moles of $\alpha,\alpha,\alpha$-trifluoro-p-tolualdehyde and one mole of acetone in ethanol solution in the presence of concentrated sodium hydroxide. It melts at 150°–152°C.

EXAMPLE 23

Preparation of 1,5-Bis(p-Methylthiophenyl)-1,4-pentadien-3-one 2-imidazolin-2-ylhydrazone hydrobromide The preparation of the subject compound is carried out by the procedure of Example 16, 1,5-bis(p-methylthiophenyl)-1,4-pentadien-3-one replacing the 1,5-bis(p-chlorophenyl)-1,4-pentadien-3-one. The product melts at 149°–150°C. with decomposition.

The starting material, 1,5-bis(p-methylthiophenyl)-1,4-pentadien-3-one is prepared by the reaction of two moles of p-methylthiobenzaldehyde and one mole of acetone in ethanol solution in the presence of concentrated sodium hydroxide. It melts at 143°–145°C.

EXAMPLE 24

Preparation of 1,5-Bis(2-Naphthyl)-1,4-pentadien-3-one 2-imidazolin-2-ylhydrazone hydrobromide The subject compound is essentially prepared by the procedure of Example 16, 1,5-bis(2-naphthyl)-1,4-pentadien-3-one replacing the 1,5-bis(p-chlorophenyl)-1,4-pentadien-3-one. Recrystallization from chloroform-benzene gives the pure compound melting at 225°–227°C.

The starting material, 1,5-bis(2-naphthyl)-1,4-pentadien-3-one, is prepared by the method of Gibson, et al., J. Chem. Soc. 1926 2247.

EXAMPLE 25

Preparation of 1,5-Bis(1-Naphthyl)-1,4-pentadien-3-one 2-imidazolin-2-ylhydrazone hydrobromide The subject compound is prepared essentially by the procedure of Example 16, 1,5-bis(1-naphthyl)-1,4-pentadien-3-one replacing the 1,5-bis(p-chlorophenyl)-1,4-pentadien-3-one. After recrystallization from methanol, the pure compound melts at 175°–177°C.

The starting material, 1,5-bis(1-naphthyl)-1,4-pentadien-3-one, is prepared by the method of Coles and Bonds, J. Am. Chem. Soc. 60 853 (1938).

EXAMPLE 26

Preparation of 1,5-Bis(p-Nitrophenyl)-1,4-pentadien-3-one 2-imidazolin-2-ylhydrazone hydrobromide The subject compound is prepared essentially by the procedure of Example 16, 1,5-bis(p-nitrophenyl)-1,4-pentadien-3-one replacing the 1,5-bis(p-chlorophenyl)-1,4-pentadien-3-one. The pure compound melts at 262°–264°C. with decomposition.

The starting material, 1,5-bis(p-nitrophenyl)-1,4-pentadien-3-one, is prepared by the method of Petrenko-Kritschenko, Ber. 31 1508 (1898).

EXAMPLE 27

Preparation of 1,5-bis(3,4-Methylenedioxyphenyl)--Bis(-pentadien-3-one 2-imidazolin-2-ylhydrazone hydrobromide The subject compound is prepared essentially by the procedure of Example 17, 1,5-bis(3,4-methylenedioxyphenyl)-1,4-pentadien-3-one replacing the 1,5-bis(p-chlorophenyl)-1,4-pentadien-3-one. The product melts at 216°–219°C.

The starting material, 1,5-bis(3,4-methylenedioxyphenyl)-1,4-pentadien-3-one is prepared by the method of Robeiro et al., Chem. Abst. 46 6387 (1952).

EXAMPLE 28

Preparation of 1,5-Bis(m-Nitrophenyl)-1,4-pentadien-3-one 2-imidazolin-2-ylhydrazone hydrobromide The preparation of the subject compound was carried out essentially by the procedure of Example 16, 1,5-bis(m-nitrophenyl)-1,4-pentadien-3-one replacing the 1,5-bis(p-chlorophenyl)-1,4-pentadien-3-one. The compound melts at 252°–253°C.

The starting material, 1,5-bis(m-nitrophenyl)-1,4-pentadien-3-one, is prepared by the method of Petrenko-Kritschenko, Ber. 31 1508 (1898).

EXAMPLE 29

Preparation of 1,5-Bis(3,4-Dimethoxypenyl)-1,4-pentadien-3-one 2-imidazolin-2-ylhydrazone hydrobromide The subject compound is prepared by the procedure of Example 16, 1,5-bis(3,4-dimethoxyphenyl)-1,4-pentadien-3-one replacing the 1,5-bis(p-chlorophenyl)-1,4-pentadien-3-one. After recrystallization from methanol-chloroform, the product melts at 190°–193°C.

The starting materials, 1,5-bis(3,4-dimethoxyphenyl)-1,4-pentadien-3-one, is prepared by the procedure of Baker and Williams, J. Chem. Soc. 1959 1295.

EXAMPLE 30

Preparation of 1,5-Bis(o-Tolyl)-1,4-pentadien-3-one 2-imidazolin-2-ylhydrazone hydrobromide The preparation of the subject compound is carried out essentially by the procedure of Example 16, 1,5-bis(o-tolyl)-1,4-pentadien-3-one replacing the 1,5-bis(p-chlorophenyl-1,4-pentadien-3-one. Recrystallization from chloroform-benzene gives the pure product melting at 226°–227°C.

The starting material, 1,5-bis(o-tolyl)-1,4-pentadien-3-one, was prepared by the method of Friedmann and van Heyninger, J. Prakt. Chem. 145 337 (1936).

EXAMPLE 31

Preparation of 1,5-Bis(m-Tolyl)-1,4-pentadien-3-one 2-imidazolin-2-ylhydrazone hydrobromide The preparation of the subject compound is carried out essentially by the procedure of Example 16, 1,5-bis(m-tolyl)-1,4-pentadien-3-one replacing the 1,5-bis(p-chlorophenyl)-1,4-pentadien-3-one. The compound precipitates as the mono-n-propanolate adduct melting at 120°–123°C.

The starting material, 1,5-bis(m-tolyl)-1,4-pentadiene-3-one, is prepared by the reaction of two moles of m-tolualdehyde and one mole of acetone in ethanol in the presence of concentrated sodium hydroxide. After recrystallization from benzene-hexane, it melts at 73°–74°C.

EXAMPLE 32

Preparation of 1,5-Bis(o-Chlorophenyl)-1,4-pentadien-3-one 2-imidazolin-2-ylhydrazone hydrobromide The preparation of the subject compound is carried out essentially by the procedure of Example 16, 1,5-bis(o-chlorophenyl)-1,4-pentadien-3-one replacing the 1,5-bis(p-chlorophenyl)-1,4-pentadien-3-one. The compound melts at 221°–222°C. with decomposition.

The starting material, 1,5-bis(o-chlorophenyl)-1,4-pentadien-3-one, is prepared by the method of Straus, et al., Ber. 51 1457 (1918).

EXAMPLE 33

Preparation of 1,5-Bis(m-Chlorophenyl)-1,4-pentadien-3-one 2-imidazolin-2-ylhydrazone hydrobromide The preparation of the subject compound is carried out essentially by the procedure of Example 16, 1,5-bis(m-chlorophenyl)-1,4-pentadien-3-one replacing the 1,5-bis(p-chlorophenyl)-1,4-pentadien-3-one. The compound melts at 208°–210°C.

The starting material, 1,5-bis(m-chlorophenyl)-1,4-pentadien-3-one, is prepared by the reaction of two moles of m-chlorobenzaldehyde and one mole of acetone in ethanol solution in the presence of concentrated sodium hydroxide solution. After recrystallization from benzene-hexane, it melts at 127°–128°C.

EXAMPLE 34

Preparation of 1,5-Bis(p-Chlorophenyl)-1,4-pentadien-3-one 4-phenyl-2imidazolin-2-ylhydrazine hydroiodide The preparation of the subject compound is carried out essentially by the procedure of Example 16, 4-phenyl-2-imidazolin-2-ylhydrazine hydroiodide replacing the 2-imidazolin-2-ylhydrazine hydrobromide and 57 percent aqueous hydroiodic acid the hydrobromid acid. The compound melts at 212°–213°C. A portion neutralized with concentrated ammonium hydroxide gives the free base melting at 105°–107°C.

The starting material, 4-phenyl-2-imidazolin-2-ylhydrazine hydroiodide, is prepared as follows: 4-phenylimidazolidine-2-thione and methyliodide in refluxing ethanol yield 2-methylthio-4-phenyl-2-imidazolin hydroiodide, which upon treatment with hydrazine in boiling ethanol yields the desired intermediate, melting at 107°–108°C.

EXAMPLE 35

Preparation of 1,5-Bis(p-Chlorophenyl)-1,4-pentadien-3-one 5,5-diphenyl-2-imidazolin-2-ylhydrazone The crude hydrobromide salt of the subject compound is obtained essentially by the procedure of Example 16, 5,5-diphenyl-2-imidazolin-2-ylhydrazine hydrobromide replacing the 2-imidazolin-2-ylhydrazine hydrobromide. It is converted to the free base by treatment with aqueous sodium hydroxide, which after recrystallization from ethanol-benzene melts at 215°–217°C.

The starting material, 5,5-diphenyl-2-imidazolin-2-ylhydrazine hydrobromide, is prepared as follows: 4,4-diphenylimidazolin-2-thione, prepared by the method of Marshall, J. Am. Chem. Soc. 78 3696 (1956), is treated with ethyl bromide in refluxing ethanol to yield 5,5-diphenyl-2-ethylthio-2-imidazoline hydrobromide, which upon treatment with hydrazine in refluxing ethanol gives the desired intermediate, melting point 227°–8°C.

EXAMPLE 36

Preparation of 1,5-Bis(p-Chlorophenyl)-1,4-pentadien-3-one 3α,4,5,6,7,7a-hexahydrobenzimidazol-2-ylhydrazone hydrobromide The subject compound is prepared essentially by the procedure of Example 16, 3α,4,5,6,7,7a-hexahydrobenzimidazol-2-ylhydrazine hydrobromide replacing the 2-imidazolin-2-ylhydrazine hydrobromide. The compound melts at 241°–243°C.

The preparation of 3α,4,5,6,7a-hexahydrobenzimidazol-2-hydrazine hydrobromide is carried out as follows: 3α,4,5,6-7a-hexahydrobenzimidazole-2-thione, prepared by the method of Huenig and Mueller, Ann. 651 89 (1962), is treated with ethylbromide in refluxing ethanol, and the resultant 2-ethylthio-3a,4,5,6,7,7a-hexahydrobenzimidazole hydrobromide then treated with hydrazine in refluxing ethanol, yielding the desired intermediate, melting point 195°–196°C.

EXAMPLE 37

Preparation of 1,5-Bis(p-Chlorophenyl)-1,4-pentadien-3-one 4-methyl-2-imidazolin-2-ylhydrazone hydrochloride The preparation of the subject compound is carried out essentially by the procedure of Example 16, 4-methyl-2-imidazolin-2-ylhydrazine hydrochloride replacing the 2-imidazolin-2-ylhydrazine hydrobromide, and concentrated hydrochloric acid replacing the hydrobromic acid. The compounds melt at 198°–200°C.

The starting material, 4-methyl-2-imidazolin-2-ylhydrazine hydrochloride, is prepared as follows: 4-methylimidazolidin-2-thione and methyl iodide react in refluxing ethanol to give 4-methyl-2-methylthio-2-imidazoline hydroiodide, which upon treatment with hydrazine in boiling ethanol yields 4-methyl-2-imidazolin-2-ylhydrazine hydroiodide. Subsequent treatment with silver chloride in aqueous or ethanol solution then gives the hydrochloride salt melting at 128°–130°C.

EXAMPLE 38

Preparation of 1,5-Bis(p-Chlorophenyl)-1,4-pentadien-3-one 5,5-dimethyl-2-imidazolin-2-ylhydrazone hydrobromide The preparation of the subject compound is carried out essentially by the procedure of Example 16, 5,5-dimethyl-2-imidazolin-2-ylhydrazone hydrobromide replacing the 2-imidazolin-2-ylhydrazine hydrobromide and concentrated hydrochloric acid replacing the hydrobromic acid.

The starting material, 5,5-dimethyl-2-imidazolin-2-ylhydrazine hydrochloride is prepared as follows: 4,4-dimethylimidazolidin-2-thione and ethyl bromide in refluxing ethanol gives 5,5-dimethyl-2-methylthio-2-imidazoline hydrobromide, which when treated with hydrazine in refluxing ethanol gives a solution of 5,5-dimethyl-2-imidazolin-2-ylhydrazine hydrobromide.

EXAMPLE 39

Preparation of 1-(p-Chlorophenyl)-5-phenyl-1,4-pentadien-3-one 2-imidazolin-2-ylhydrazone hydrobromide The title compound is prepared essentially by the procedure of Example 16, 1-(p-chlorophenyl)-5-phenyl-1,4-pentadien-3-one replacing the 1,5-bis(p-chlorophenyl)-1,4-pentadien-3-one. The compound melts at 146°–148°C.

The starting material, 1-(p-chlorophenyl)-5-phenyl-1,4-pentadien-3-one, is prepared by the method of Straus and Blankenhorn, Ann. 415 256.

EXAMPLE 40

Preparation of 1-(p-Chlorophenyl)-5-(p-tolyl)-1,4-pentadien-3-one 2-imidazolin-2-ylhydrazone hydrobromide The subject compound is prepared essentially by the procedure of Example 16, 1-(p-chlorophenyl)-5-(p-tolyl)-1,4-pentadien-3-one replacing the 1,5-bis(p-chlorophenyl)-1,4-pentadien-3-one. The compound containing one mole of ethanol of crystallization melts at 179°–181°C.

The starting material, 1-(p-chlorophenyl)-5-(p-tolyl)-1,4-pentadien-3-one, is prepared by the reaction of p-chlorophenyl-2-propen-2-one and p-tolualdehyde in ethanol solution in the presence of aqueous sodium hydroxide. After recrystallization from benzene, it melts at 192.5°–194°C.

EXAMPLE 41

Preparation of 1,5-Bis(p-Chlorophenyl)-1,4-pentadien-3-one 1,4,5,6-tetrahydropyrimidin-2-ylhydrazone hydrochloride A mixture consisting of 45 grams of 1,5-bis(p-chlorophenyl)-1,4-pentadien-3-one, 22.7 grams of 1,4-,5,6-tetrahydropyrimidin-2-ylhydrazine hydrochloride, 500 ml of n-propanol, and 10 drops of concentrated hydrochloric acid is stirred at the boiling point under reflux for 1 hour. Concentration to 300 ml. volume and subsequent cooling at 4°C. gives an orange-red precipitate. The bulk of the color is removed by extraction with 350 ml. of boiling benzene. Recrystallization from chloroform-benzene gives 47.3 grams of pale yellow product melting at 210°–211.5°C.

If the hydroiodide salt of 1,4,5,6-tetrahydropyrimidin-2-ylhydrazine is employed, and aqueous hydroiodic acid as catalyst, the hydroiodide salt of the title compound free base is obtained, melting at 240°–242°C.

The preparation of the starting material, 1,4,5,6-tetrahydropyrimidin-2-ylhydrazine hydrochloride, is carried out as follows: 1,4,5,6-tetrahydropyrimidin-2-thione and methyl chloride (excess) are added to isopropanol and the mixture heated in an autoclave at 170°–180°C. for hours. Cooling to 4°C. yields a precipitate of 2-methylthio-1,4,5,6-tetrahydropyrimidine hydrochloride, which upon treatment with hydrazine in boiling ethanol yields the desired intermediate melting at 191°–192°C.

If the methyliodide is used instead of methyl chloride, the above reaction sequence gives 1,4,5,6-tetrahydropyrimidin-2-ylhydrazine hydroiodide, melting point 174°–175°C.

EXAMPLE 42

Preparation of 1,5-Bis(m-Tolyl)-1,4-pentadien-3-one 1,4,5,6-tetrahydropyrimidin-2-ylhydrazone hydrochloride The preparation of the title compound is carried out essentially by the procedure of Example 41, 1,5-bis(m-tolyl)-1,4-pentadien-3-one replacing the 1,5-bis(p-chlorophenyl)-1,4-pentadien-3-one. The compound crystallizes with one mole of n-propanol of crystallization and melts at 103°–104°C.

EXAMPLE 43

Preparation of 1,5-Bis(p-Chlorophenyl)-1,4-pentadien-3-one 4,5,6,7-tetrahydro-1-H-1,3-diazepin-2-ylhydrazone Hydrochloride A mixture consisting of 10.6 grams of 1,5-bis(p-chlorophenyl)-1,4-pentadien-3-one, 6 grams of 4,5,6,7-tetrahydro-1H-1,3-diazepin-2-ylhydrazine hydrochloride, 120 ml. of n-propanol, and 5 drops of concentrated hydrochloric acid is stirred at the boiling point under reflux for 2 hours, then concentrated to about 35 ml. volume and cooled. The resultant crystalline mass was diluted with 50 ml. of ether and filtered. Recrystallization from chloroform-benzene gave 10 grams of the title compound, melting at 233°–234.5°C.

The starting material, 4,5,6,7-tetrahydro-1H-1,3-diazepin-2-ylhydrazine hydrochloride, is prepared as follows: 4,5,6,7-tetrahydro-2-methylthio-1H-1,3-diazepine (McKay and Kreling, Can. J. Chem. 35 1438 (1957) and hydrazine are added to ethanol, and the solution then heated to yield 4,5,6,7-tetrahydro-1H-1,3-diazepin-2-ylhydrazine hydroidide, melting point 133°–135°C. If the latter compound is treated with silver chloride in aqueous or ethanol solution, the hydrochloride salt is obtained, melting point 192°–193°C.

The hydroiodide salt of the title compound free base is obtained as a yellow crystalline product melting at 248°–295.5°C.

EXAMPLE 44

Preparation of 1,5-Bis(p-Cyanophenyl)-1,4-pentadien-3-one 4,5,6,7-tetrahydro-1H-1,3-diazepin-2-ylhydrazone hydrochloride The preparation of the subject compound is effected essentially by the procedure of Example 43, 1,5-bis(p-cyanophenyl)-1,4-pentadien-3-one replacing the 1,5-bis(p-chlorophenyl)-1,4-pentadien-3-one.

The starting material, 1,5-bis(p-cyanophenyl)-1,4-pentadien-3-one, is prepared by the reaction of two moles of p-cyanobenzaldehyde and one mole of acetone in ethanol solution in the presence of a trace amount of sodium hydroxide. After recrystallization from aqueous ethanol it melts at 141°–143°C.

EXAMPLE 45

Preparation of 1,5-Bis(p-Methylsulfonylphenyl)-1,4-pentadien-3-one-4,5,6,7-tetrahydro-1H-1,3-diazepin-2-ylhydrazone hydrochloride The preparation of the subject compound is carried out essentially by the procedure of Example 44, 1,5-bis(p-methylsulfonylphenyl)-1,4-pentadien-3-one replacing the 1,5-bis(p-chlorophenyl)-1,4-pentadien-3-one.

The starting material, 1,5-bis(p-methylsulfonylphenyl)-1,4-pentadien-3-one, is prepared by the reaction of two moles of p-methylsulfonylbenzaldehyde and one mole of acetone in ethanol solution in the presence of concentrated sodium hydroxide. After recrystallization from aqueous-2-methoxyethanol it melts at 212°–215°C. with decomposition.

EXAMPLE 46

Preparation of 1,5-Bis(p-Sulfamoylphenyl)-1,4-pentadien-3-one 2-imidazolin-2-ylhydrazone hydrobromide The subject compound is prepared essentially by the procedure of Example 16, 1,5-bis(p-sulfamylphenyl)-1,4-pentadien-3-one replacing the 1,5-bis(p-chlorophenyl)-1,4-pentadien-3-one. The compopund melts at 215°–220°C. with one mole of n-propanol of crystallization.

The starting material, 1,5-bis(p-sulfamylphenyl)-1,4-pentadien-3-one, is prepared by the reaction of two moles of p-sulfamylbenzaldehyde and one mole of acetone is aqueous ethanol containing four moles of sodium hydroxide. At the conclusion of the reaction, the solution is clarified and acidified, precipitating the desired intermediate, melting at 286°–287°C. with decomposition.

EXAMPLE 47

Preparation of 1,5-Bis(p-Carboxyphenyl)-1,4-pentadien-3-one 2-imidazolin-2-ylhydrazone hydrobromide The preparation of the title compound is carried out essentially by the procedure of Example 16, 1,5-bis(p-carboxyphenyl)-1,4-pentadien-3-one replacing the 1,5-bis(p-chlorophenyl)-1,4-pentadien-3-one.

The starting material, 1,5-bis(p-carboxyphenyl-1,4-pentadien-3-one is prepared by the reaction of two moles of p-carboxybenzaldehyde and one mole of acetone in ethanol solution in the presence of 3 mols of 10 normal sodium hydroxide. Acidification with acetic acid gives the desired intermediate melting at 370°–375°C. with decomposition.

EXAMPLE 48

Preparation of 1,5-Bis(4-Methoxy-1-naphthyl)-1,4-pentadien-3-one-4,5,6,7-tetrahydro-1H-1,3-diazepin-2-ylhydrazone hydrochloride The preparation of the title compound is carried out essentially by the procedure of Example 44, 1,5-bis(4-methoxy-1-naphthyl)-1,4-pentadien-3-one replacing the 1,5-bis(p-chlorophenyl)-1,4-pentadien-3-one.

The starting material, 1,5-bis(4-methoxy-1-naphthyL)-1,4-pentadien-3-one, is prepared by the reaction of two moles of 4-methoxy-1-naphthaldehyde and one mole of acetone in ethanol in the presence of sodium hydroxide. After recrystallization from 2-methoxyethanol, the desired intermediate melts at 192°–193°C.

EXAMPLE 49

Preparation of 1,5-Bis(p-chlorophenyl)-1,4-pentadien-3-one 5,5-Dimethyl-1,4,5,6-tetrahydropyrimidin-2-ylhydrazone hydrobromide The subject compound is prepared essentially by the procedure of Example 16, an equivalent of 5,5-dimethyl-1,4,5,6-tetrahydropyrimidin-2-ylhydrazine hydrobromide replacing the 2-imidazolin-2-ylhydrazine hydrobromide. The pure compound melts at 222°–223°C.

The starting material, 5,5-dimethyl-1,4,5,6-tetrahydropyrimidin-2-ylhydrazine hydrobromide is prepared as follows: the reaction of carbon disulfide and 1,3-diamino-2,2-dimethylpropane yields 5,5-dimethyl-1,4,5,6-tetrahydropyrimidine-2-thiol, which when treated with bromoethane in refluxing ethanol forms 5,5-dimethyl-2-ethylthio-1,4,5,6-tetrahydropyrimidine hydrobromide. Reaction of the latter compound and hydrazine in refluxing n-propanol gives the desired intermediate, melting at 234°–235°C.

EXAMPLE 50

Preparation of 1,5-Bis(2,5-xylyl)-1,4-pentadien-3-one 2-imidazolin-2-ylhydrazone hydrobromide The preparation of the above compound is effected by the procedure of Example 16, an equivalent of 1,5-bis(2,5-xylyl)-1,4-pentadien-3-one replacing the 1,5-bis(p-chlorophenyl)-1,4-pentadien-3-one. The compound melts at 177°–179°C.

The starting material, 1,5-bis(2,5-xylyl)-1,4-pentadien-3-one, is prepared by the reaction of two moles of 2,5-dimethylbenzaldehyde and one mole of acetone in ethanol solution in the presence of sodium hydroxide. After purification it melts at 140°–141°C.

EXAMPLE 51

Preparation of 1,5-Bis(3-chloro-p-tolyl)-1,4-pentadien-3-one 2-imidazolinyl-2-hydrazone hydrobromide The preparation of the subject compound is effected by the procedure of Example 16, an equivalent of 1,5-bis(3-chloro-p-tolyl)-1,4-pentadien-3-one replacing the 1,5-bis(p-chlorophenyl-1,4-pentadiene-3-one.

The starting material, 1,5-bis(3-chloro-p-tolyl)-1,4-pentadien-3-one is prepared by the reaction of two moles of 3-chloro-p-tolualdehyde [Wahl, Ann. Chim. [11] 5 (1936), pp. 5, 39] and one mole of acetone in ethanol solution in the presence of sodium hydroxide.

EXAMPLE 52

Preparation of 1,5-Bis(p-chlorophenyl)-1,4-pentadien-3-one 1,3-diaza-2-cycloocten-2-ylhydrazone hydrobromide The preparation of the above compound is effected by the procedure of Example 16, an equivalent of 1,3-diaza-2-cycloocten-2-ylhydrazine hydrobromide replacing the 2-imidazolin-2-ylhydrazine hydrobromide.

The starting material, 1,3-diaza-2-cycloocten-2-ylhydrazine hydrobromide, is prepared by the reaction of 2-mercapto-1,3-diaza-2-cyclooctene (U.S. Pat. No. 3,219,522, Example XL) and bromoethane in hot ethanol to give the 2-ethylthio derivative (HBr salt), which upon treatment with hydrazine in refluxing ethanol yields the desired intermediate.

EXAMPLE 53

Preparation of 1,5-Bis(p-Chlorophenyl)-1,4-pentadien-3-one 1,3-diaza-2-cyclononen-2-ylhydrazone hydrobromide The preparation of the subject compound is effected essentially by the procedure of Example 16, an equivalent of 1,3-diaza-2-cyclononen-2-ylhydrazine hydrobromide replacing the 2-imidazolin-2-ylhydrazine hydrobromide.

The starting material, 1,3-diaza-2-cyclononen-2-ylhydrazine hydrobromide, is prepared by the reaction of 2-mercapto-1,3-diaza-2-cyclononene (Behringer and Meier, Ann. 607 75 (1957) and bromoethane in refluxing ethanol to yield the 2-ethylmercapto derivative (HBr salt), which on treatment with hydrazine in refluxing ethanol forms the desired intermediate.

EXAMPLE 54

Preparation of 1,5-Bis(p-chlorophenyl)-1,4-pentadien-3-one 1,3-diaza-2-cyclodecen-2-ylhydrazone hydrobromide The preparation of the above compound is effected essentially by the procedure of Example 16, an equivalent of 1,3-diaza-2-cyclodecen-2-ylhydrazine hydrobromide replacing the 2-imidazolin-2-ylhydrazine hydrobromide.

The starting material, 1,3-diaza-2-cyclodecen-2-ylhydrazine hydrobromide, is prepared by the reaction of 2-mercapto-1,3-diaza-2-cyclodecene (Behringer and Meier, Ann. 607 75 (1957) and bromoethane in refluxing ethanol to give the 2-ethylmercapto derivative (HBr salt), which on treatment with hydrazine in refluxing ethanol yields the desired intermediate.

EXAMPLE 55

Preparation of 1,5-Bis(p-chlorophenyl)-1,4-pentadien-3-one 1,3-diaza-2-cyclododecen-2-ylhydrazone hydrobromide The preparation of the subject compound is effected essentially by the procedure of Example 16, an equivalent of 1,3-diaza-2-cyclododecen-2-ylhydrazine hydrobromide replacing the 2-imidazolin-2-ylhydrazine hydrobromide.

The starting material, 1,3-diaza-2-cyclododecene-2-ylhydrazine hydrobromide, is prepared by the reaction of 2-mercapto 1,3-diaza-2-cyclododecene [Behringer and Meier, Ann. 607 75 (1957)] and bromoethane in refluxing ethanol to give the 2-ethylthio derivative (HBr salt), which on treatment with hydrazine in refluxing ethanol yields the desired intermediate.

I claim:

1. A pentadiene of the formula:

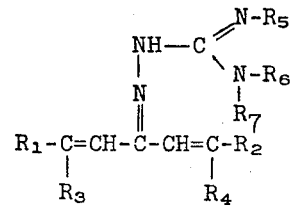

wherein $R_1$ and $R_2$ may be the same or different and are selected from the group consisting of phenyl, halophenyl, carboxyphenyl, lower alkoxy($C_1$–$C_4$)phenyl, diloweralkoxy($C_1$–$C_4$)phenyl, biphenylyl, alkyl(-$C_1$–$C_4$)phenyl, dialkyl($C_2$–$C_8$)phenyl, nitrophenyl, trifluoromethylphenyl, lower alkyl($C_1$–$C_4$)sulfonylphenyl, lower alkyl($C_1$–$C_4$)thiophenyl, methylenedioxyphenyl, cyanophenyl, sulfamylphenyl, carboloweralkoxy($C_1$–$C_4$)phenyl, naphthyl, lower alkoxy($C_1$–$C_4$)naphthyl and halonaphthyl; $R_3$ and $R_4$ may be the same or different and are selected from the group consisting of hydrogen, lower alkyl $C_1$–$C_4$, phenyl and halophenyl; $R_5$ and $R_6$ are lower alkyl $C_1$–$C_4$ and when taken together an alkylene group of 2 to 9 carbon atoms, methyl or a phenyl alkylene group of 2 to 4 carbon atoms, a dimethyl or diphenyl alkylene group of 2 to 4 carbon atoms and $R_7$ is hydrogen or lower alkyl $C_1$–$C_4$, and non-toxic acid salts thereof.

2. The pentadiene in accordance with claim 1, 1,5-bis(p-chlorophenyl)-1,4-pentadiene-3-one 4,5,6,7-tetrahydro-1H-1,3-diazepin-2-ylhydrazone hydrochloride.

3. The pentadiene in accordance with claim 1, 1,5-bis(p-chlorophenyl)-1,4-pentadien-3-one 1,4,5,6-tetrahydropyrimidin-2-ylhydrazone hydrochloride.

4. The pentadiene in accordance with claim 1, 1,5-bis(p-methoxyphenyl)-1,4-pentadien-3-one 2-imidazolin-2-ylhydrazone hydrobromide.

5. The pentadiene in accordance with claim 1, 1,5-bis(p-tolyl)-1,4-pentadien-3-one 2-imidazolin-2-ylhydrazone hydrobromide.

6. The pentadiene in accordance with claim 1, 1,5-bis(p-chlorophenyl)-1,4-pentadien-3-one N-methylamidinohydrazone hydroiodide.

7. The pentadiene in accordance with claim 1, 1,5-bis(p-chlorophenyl)-1,4-pentadien-3-one 2-imidazolin-2-ylhydrazone hydrochloride.

8. The pentadiene in accordance with claim 1, 1,5-bis(4-chlorophenyl)-1,4-pentadien-3-one amidinohydrazone hydrochloride.

9. The pentadiene in accordance with claim 1, 1,5-bis(p-methylthiophenyl)-1,4-pentadien-3-one 2-imidazolin-2-ylhydrazone hydrobromide.

10. A pentadiene of the formula:

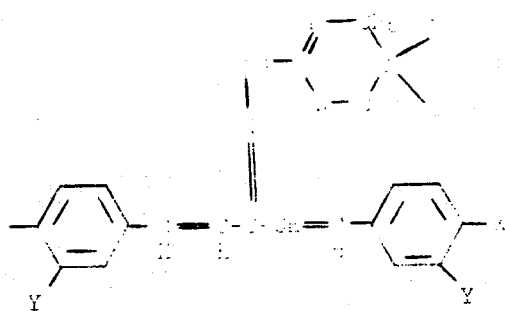

wherein $R_8$ and $R_9$ are hydrogen or methyl; X is halo or hydrogen and Y is lower alkyl $C_1$–$C_4$ or hydrogen or a non-toxic acid salt thereof.

11. The pentadiene in accordance with claim 10, 1,5-bis(m-tolyl)-1,4-pentadiene-3-one 1,4,5,6-tetrahydropyrimidin-2-ylhydrazone hydrochloride.

12. The pentadiene in accordance with claim 10, 1,5-bis(p-chlorophenyl)-1,4-pentadiene-3-one 5,5-dimethyl-1,4,5,6-tetrahydropyrimidin-2-ylhydrazone hydrobromide.

* * * * *

UNITED STATES PATENT OFFICE
CERTIFICATE OF CORRECTION

Patent No. 3,878,201        Dated   April 15, 1975

Inventor(s)   Andrew Stephen Tomcufcik

It is certified that error appears in the above-identified patent and that said Letters Patent are hereby corrected as shown below:

Column 5, line 41 "medadione" should be -- menadione --.

Column 12, line 66 "-Bis(-" should be -- -1,4- --.

Column 13, line 25, "penyl)-" should be -- phenyl- --.

Column 14, line 39, "hydrobromid" should be -- hydrobromic --.

Column 15, line 19, "Huenig and Mueller" should be -- Hunig and Muller --.

Column 17, line 40, "248°-295.5°C." should be -- 248°-249.5°C. --.

Column 18, line 13, "compopund" should be -- compound --.

Column 22, please replace the formula in Claim 10 because it is incomplete.

Signed and Sealed this twelfth Day of August 1975

[SEAL]

Attest:

RUTH C. MASON
*Attesting Officer*

C. MARSHALL DANN
*Commissioner of Patents and Trademarks*